United States Patent
Keshet et al.

(10) Patent No.: US 7,440,016 B2
(45) Date of Patent: Oct. 21, 2008

(54) METHOD OF PROCESSING A DIGITAL IMAGE

(75) Inventors: Renato Keshet, Haifa (IL); Yacov Hel-Or, Zichron Yacov (IL); Stephen B. Pollard, Gloucestershire (GL)

(73) Assignee: Hewlett-Packard Development Company, L.P., Houston, TX (US)

( * ) Notice: Subject to any disclaimer, the term of this patent is extended or adjusted under 35 U.S.C. 154(b) by 704 days.

(21) Appl. No.: 10/743,623

(22) Filed: Dec. 22, 2003

(65) Prior Publication Data

US 2005/0134713 A1 Jun. 23, 2005

(51) Int. Cl.
H04N 3/14 (2006.01)
H04N 5/335 (2006.01)
H04N 9/04 (2006.01)
H04N 9/083 (2006.01)

(52) U.S. Cl. .................................................... 348/280
(58) Field of Classification Search ................. 348/272, 348/273, 280, 162, 167, 518, 525
See application file for complete search history.

(56) References Cited

U.S. PATENT DOCUMENTS

| | | | |
|---|---|---|---|
| 5,373,322 A | 12/1994 | Laroche et al. | |
| 5,382,976 A | 1/1995 | Hibbard | |
| 5,475,769 A | 12/1995 | Wober et al. | |
| 5,541,653 A | 7/1996 | Peters et al. | |
| 5,875,040 A | 2/1999 | Matraszek et al. | |
| 6,229,578 B1 * | 5/2001 | Acharya et al. | 382/162 |
| 6,404,918 B1 | 6/2002 | Hel-Or et al. | |
| 6,618,503 B2 | 9/2003 | Hel-Or et al. | |
| 7,053,944 B1 * | 5/2006 | Acharya et al. | 348/273 |
| 7,346,210 B2 * | 3/2008 | Chen | 382/162 |
| 7,362,897 B2 * | 4/2008 | Ishiga | 382/167 |
| 7,379,098 B2 * | 5/2008 | Yamamoto et al. | 348/253 |
| 7,379,625 B2 * | 5/2008 | Wang et al. | 358/525 |
| 2002/0186309 A1 | 12/2002 | Keshet et al. | |
| 2003/0048279 A1 * | 3/2003 | Kok et al. | 345/606 |
| 2003/0052981 A1 * | 3/2003 | Kakarala et al. | 348/272 |
| 2003/0098925 A1 * | 5/2003 | Orlick | 348/448 |

(Continued)

FOREIGN PATENT DOCUMENTS

EP 1050847 11/2000

(Continued)

OTHER PUBLICATIONS

"Color Filter Array Demosaicking: New Method and Performance Measures", by W. Lu and Y.- P, Tan, on the IEEE Transactions on Image Processing, vol. 12, No. 10, Oct. 2003, pp. 1194-1210.

(Continued)

Primary Examiner—Lin Ye
Assistant Examiner—Jason Whipkey

(57) ABSTRACT

Processing of a mosaic digital image includes interpolating values of a first color at pixels where the first color was not sampled. The interpolation of the first color value at a given pixel includes determining likelihoods of the given pixel belonging to the same region as each of at least two other pixels having sampled values of the first color. The other pixels are in different directions relative to the given pixel. The interpolation further includes using the likelihoods and the sampled values of the other pixels to interpolate the first color at the given pixel.

31 Claims, 6 Drawing Sheets

U.S. PATENT DOCUMENTS

| | | | |
|---|---|---|---|
| 2003/0117507 A1 | 6/2003 | Kehtarnavaz et al. | |
| 2003/0169353 A1 | 9/2003 | Keshet et al. | |
| 2004/0081355 A1* | 4/2004 | Takahashi | 382/165 |
| 2004/0161145 A1* | 8/2004 | Embler | 382/165 |
| 2004/0169747 A1* | 9/2004 | Ono et al. | 348/272 |
| 2004/0240726 A1* | 12/2004 | Stavely et al. | 382/162 |

FOREIGN PATENT DOCUMENTS

| | | |
|---|---|---|
| JP | 2000 224601 | 1/2001 |

OTHER PUBLICATIONS

Ramanath et al., "Adaptive Demosaicking", Journal of Electronic Imaging, 12(4), 633-42 (Oct. 2003).

Zomet et al., "Multi-Sensor Sup r-Resolution", Proceedings of the IEEE Workshop on Applications of Comput r Vision, Orlando, Dec. 2002.

Muresan et al: "Reconstruction of Color Images from CCD Arrays" proceedings OT DSP Fest, XX, XX, Aug. 2, 2000 p. 1-6, XP002243635.

Kimmel R: "Demosaicing: Image Reconstruction from Color CCD Samples" IEEE Transactions on Image Processing, IEEE Inc. New York, US, vol. 8, No. 9 Sep. 9, 1999 p. 1221-1228.

Ramanath R et al: "Demosaicking Methods for Bayer Color Arrays" Journal of Electronic Imaging, SPIE + IS&T, US vol. 11, No. 3 Jul. 3, 2002 p. 306-315 ISSN: 1017-9909.

* cited by examiner

METHOD OF PROCESSING A DIGITAL IMAGE

BACKGROUND

A typical digital camera includes an array of photosensors, with each photosensor sensitive to only a single color of light. For example, each photosensor is sensitive to one of red, green and blue light. During image acquisition, an image is focused on the photosensor array, and each photosensor measures or "samples" a single color of the image. If red-sensitive, green-sensitive and blue-sensitive photosensors can be located at each pixel, the photosensor array can acquire an image having "full color" at each pixel.

The photosensor arrays of certain digital cameras have only a single photosensor at each pixel location. These cameras produce digital images that do not have full color information at each pixel. Since each photosensor is sensitive to only a single color, the photosensor array produces a digital image having only a single color sample at each pixel. For example, a digital camera produces a digital image having one of red, green and blue sampled information at each pixel. Information about the other two colors at each pixel is missing. This undersampled digital image is referred to as a "mosaic" image.

A demosaicing algorithm may be used to transform an undersampled digital image into a digital image having full color information at each pixel value. A typical demosaicing algorithm interpolates the missing pixel information from the sampled pixel values in the mosaic image.

Edges and other abrupt photometric transitions present a particular problem to demosaicing. A simple demosaicing algorithm such as bilinear interpolation fills in a missing pixel value by taking an average of sampled values from neighboring pixels. However, some of those neighbors might lie on opposite sides of an edge. Some of the neighbors lying on one side of the edge might belong to one object, while the other neighbors lying on the other side might belong to a different object. Consequently, the interpolated pixel information might not describe either object. Since traditional bilinear interpolation does not account for edges, color information at edges in the demosaiced image can be distorted.

More complex demosaicing algorithms try to account for edges. Still, even the more complex demosaicing algorithm can introduce artifacts into the demosaiced image. Zippering and fringing are typical artifacts at edges in the demosaiced image. These artifacts can degrade image quality.

A typical digital camera can perform the demosaicing. This capability allows a typical digital camera to display and upload images having full color at each pixel. However, memory and processing power of a typical digital camera are limited. The limited memory and processing power can constrain the complexity of the demosaicing algorithm and hamper the ability to account for edges and reduce artifacts at the edges during demosaicing.

A demosaicing algorithm that is simple and fast, and that reduces edge blurring and the visibility of certain artifacts at edges, is desirable. Such a demosaicing algorithm is especially desirable for digital cameras.

SUMMARY

According to one aspect of the present invention, processing of a mosaic digital image includes interpolating values of a first color at pixels where the first color was not sampled. The interpolation of the first color value at a given pixel includes determining likelihoods of the given pixel belonging to the same region as each of at least two other pixels having sampled values of the first color. The other pixels are in different directions relative to the given pixel. The interpolation further includes using the likelihoods and the sampled values of the other pixels to interpolate the first color at the given pixel.

Other aspects and advantages of the present invention will become apparent from the following detailed description, taken in conjunction with the accompanying drawings, illustrating by way of example the principles of the present invention.

DETAILED DESCRIPTION

Figure 1:
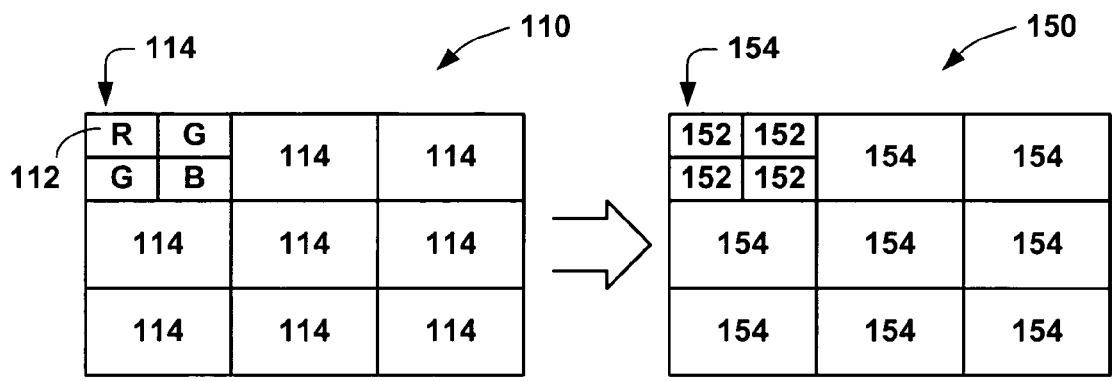
FIG. 1 is an illustration of a photosensor arrangement for a typical digital camera, and corresponding pixels of a mosaic image.

As shown in the drawings for purposes of illustration, the present invention is embodied in the processing of a mosaic image to produce a digital image having full color information at each pixel. Also for the purposes of illustration, the demosaicing will be described in connection with a photosensor arrangement known as a Bayer color filter array (CFA).

Reference is made to FIG. 1, which illustrates a photosensor array 110 having photosensors 112 arranged in a Bayer CFA. The photosensors 112 are arranged in 2×2 cells 114. Each cell 114 consists of two photosensors sensitive to green (G) light only, one photosensor sensitive to red (R) light only, and one photosensor sensitive to blue (B) light only. The cells 114 are repeated (tiled) across the photosensor array 110.

FIG. 1 also illustrates a mosaic digital image 150. Each block 154 of the mosaic image 150 corresponds to a cell 114 of the photosensor array 110. Each pixel 152 of the mosaic image 150 is described by an n-bit word, and each n-bit word provides one of red, green and blue color sampled information. In each 2×2 block 154 of the mosaic image 150, green information is sampled at two pixels, red information is sampled at one pixel, and blue information is sampled at one pixel.

Figure 2:
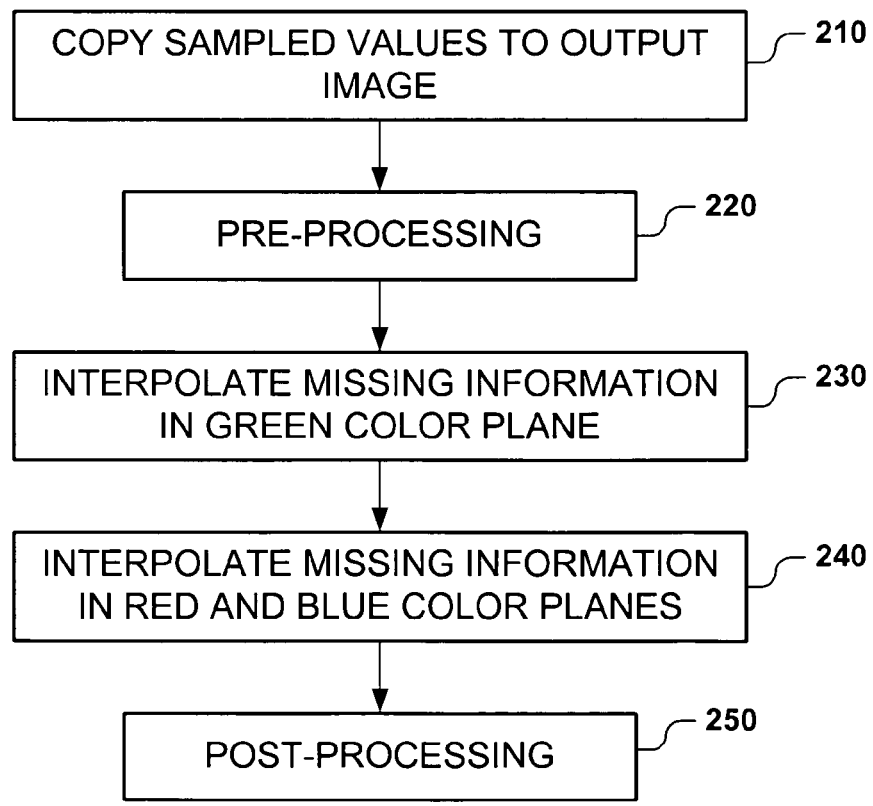
FIG. 2 is an illustration of a method of performing image demosaicing in accordance with an embodiment of the present invention.

Reference is made to FIG. 2, which illustrates a method of processing a mosaic image into an output image having full color information at each pixel. Each pixel of the output image may be represented by a digital word including n-bits for red information, n-bits for green information, and n-bits for blue information.

The sampled values of the mosaic image are copied into their corresponding positions in the output image (210). For example, a mosaic image with a Bayer pattern has pixel inputs m(i, j), where i and j are indices to the rows and columns of the mosaic image. The sampled values of the mosaic image may be copied to the output image as follows:

$I_R(i,j)=m(i,j)$ for all red samples (i and j even), $I_G(i,j)=m(i,j)$ for all green samples (i+j odd), and $I_B(i,j)=m(i,j)$ for all blue samples (i and j odd), where $I_R(i,j)$ represents red information at pixel (i,j) of the output image, $I_G(i,j)$ represents green information at pixel (i,j) of the output image, and $I_B(i,j)$ represents blue information at pixel (i,j) of the output image.

The sampled values may be pre-processed (220). The pre-processing is application-specific. In a digital camera for example, pre-processing between image acquisition and demosaicing may include flare reduction, data linearization, color balance, and denoising. Denoising may be performed if the sampled pixel values (that is, the raw data) are noisy or expected to be noisy. Noisy raw data can cause artifacts and noise to appear in the demosaiced image.

Missing information in the green color plane is interpolated (230). For a given pixel that is missing green information, sampled values of nearby pixels are used to determine the likelihoods of the given pixel belonging to the same region as each of its neighbors having sampled green values. These neighbors are in different directions relative to the given pixel. For example, these neighbors might include a first pixel north of the given pixel, a second pixel south of the given pixel, a third pixel east of the given pixel, and a fourth pixel west of the given pixel.

A high likelihood suggests that the missing green value at the given pixel is likely to be close to the sampled value of the neighbor (e.g., an edge between the given pixel and the neighbor is not likely). Therefore, the sampled green value of the neighbor can be used with confidence in the interpolation of the green value at the given pixel. Thus a neighbor having a high likelihood is given a high weight in the interpolation process. Conversely, a low likelihood suggests that the given pixel is likely to be part of a different object than the neighbor (e.g., an edge between the given pixel and the neighbor is likely). Thus a neighbor having a low likelihood is given a low weight in the interpolation process.

The interpolation also includes computing correction terms for each direction. A correction term for a direction may be computed as a difference between the sampled value at the given pixel and a sampled value of the same color at a nearby pixel in that direction.

The interpolation further includes using the likelihoods, the sampled green values of the other pixels, and the correction terms to interpolate the green value at the given pixel. For example, the likelihoods are used to assign weights to the sampled values and the correction terms, and the green value at the given pixel is interpolated as a weighted average of the sampled green values and the correction terms. The interpolated green value is added to the output image.

The use of the weighted correction terms may regarded as a high frequency correction to the interpolated green value. The same likelihood and weight may be used for the same direction. That is, the likelihood and weight computed for a measured green value may also be used for the correction term in the same direction. The meaning of "same direction" will become clear from examples below. In the alternative, likelihoods and weights may be computed separately for the correction terms.

Missing information in the other color planes is interpolated and added to the output image (240). Missing information in each of the red and blue color planes may be interpolated by using weighted averaging in the manner similar to that used to interpolate the missing information in the green color plane. Other methods of interpolating the missing information in each of the red and blue color planes include bilinear interpolation, affine interpolation, and a canonical correlation method, all of which will be described below. At the completion of step 240, each pixel I(i,j) in the output image has red information $I_R(i,j)$, green information $I_G(i,j)$, and blue information $I_B(i,j)$.

Post processing may be performed on the output (demosaiced) image (250). The post-processing is application-specific. In a digital camera for example, the post-processing may include color transformation, tone reproduction, sharpening, and compression.

Figure 3:
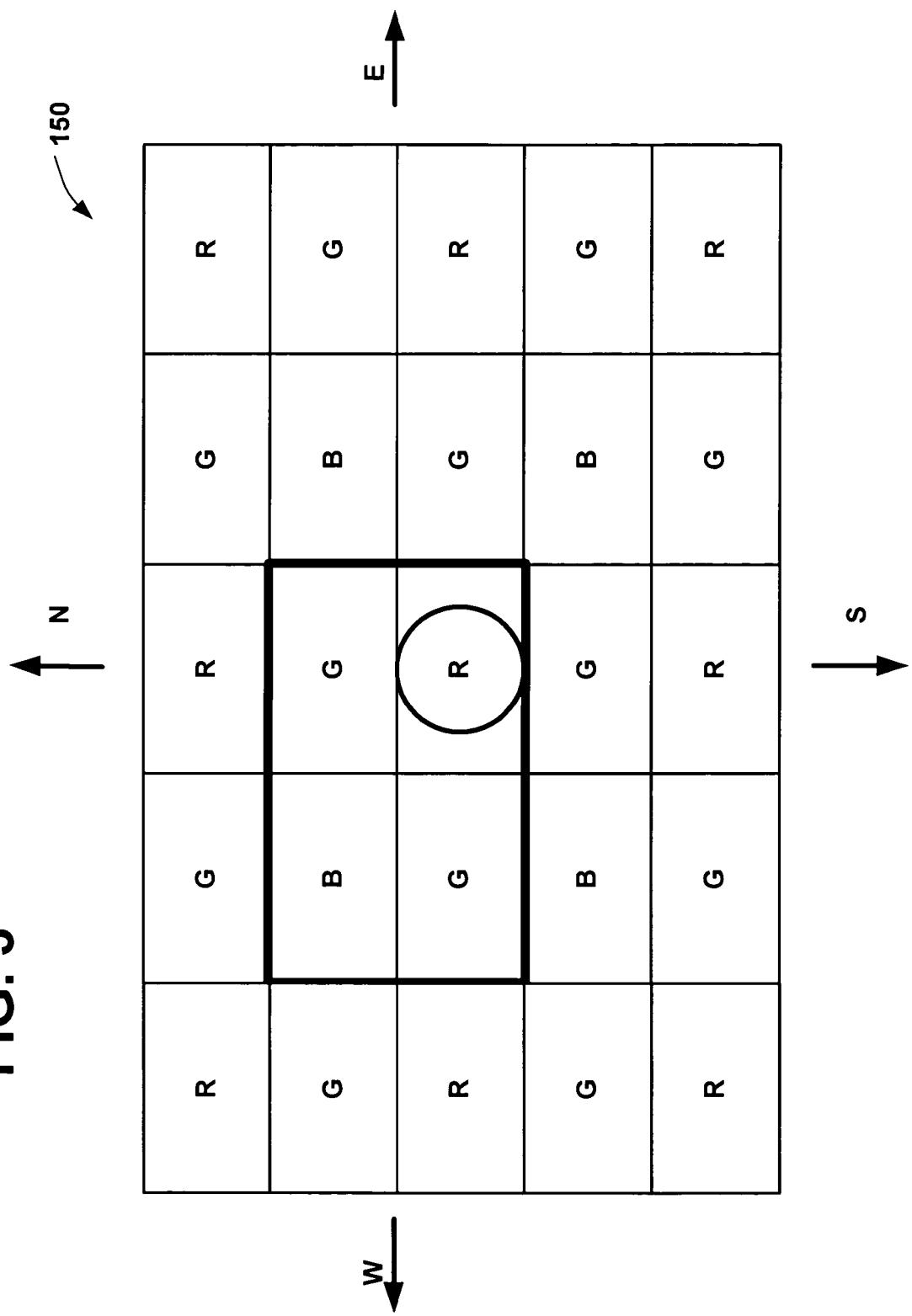
FIG. 3 is an illustration of an exemplary pixel neighborhood that can be used to interpolate missing green information at a given pixel in accordance with an embodiment of the present invention.

Reference is now made to FIG. 3, which shows a few pixels of the output image after the sampled values are copied to it, but before any of the missing values are interpolated. The letters R, G and B denote the sampled colors at the pixels. Arrows denote possible directions. The labels N, S, E and W identify these possible directions as north, south, east and west (these directions are figurative, not literal). The north and south directions are orthogonal to the east and west directions.

Figure 4:
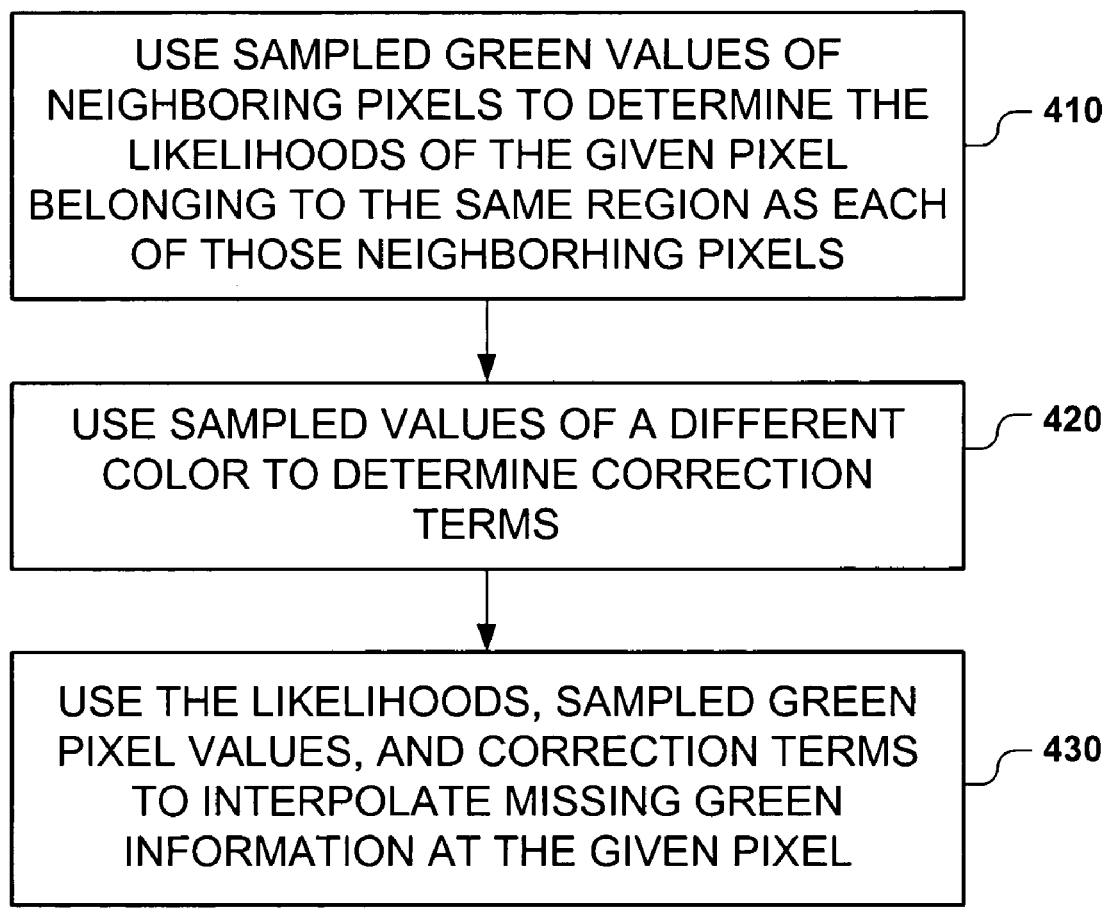
FIG. 4 is an illustration of a method of interpolating missing green information during demosaicing in accordance with an embodiment of the present invention.

Additional reference is made to FIG. 4, which illustrates a method of interpolating the missing information in the green color plane. The method may be performed for each pixel that is missing green information in the mosaic image.

By way of example, the method will be described for the pixel that is circled in FIG. 3. The given pixel in FIG. 3 has a sampled red value, but is missing green and blue information. Sampled green values are at pixels to the immediate north, south, east and west of the given pixel.

Sampled green values of the neighboring pixels are used to determine the likelihoods of the given pixel belonging to the same region as each of those neighboring pixels (410). Considering the example of FIG. 3, a first likelihood of the given pixel belonging to the same region as the north neighbor is determined, a second likelihood of the given pixel belonging to the same region as the south neighbor is determined, a third likelihood of the given pixel belonging to the same region as the east neighbor is determined, and a fourth likelihood of the given pixel belonging to the same region as the west neighbor is determined.

Each likelihood may be based on differences of the sampled green values. For example, the first likelihood may be computed from a difference between the sampled green values of the north and south neighbors; the second likelihood may be computed from a difference between the sampled green values of the north and south neighbors; the third likelihood may be computed from a difference between the sampled green values of the east and west neighbors; and the fourth likelihood may be computed from a difference between the sampled green values of the east and west neighbors.

Each likelihood may be also based on differences between the sampled red value of the given pixel and the sampled red value closest to the given pixel in the corresponding direction. For example, the first likelihood term for the north neighbor also may be computed from a difference between the sampled red value of the given pixel and the sampled red value north of the given pixel. The second likelihood term for the south neighbor also may be computed from a difference between the sampled red value of the given pixel and the sampled red value south of the given pixel. The third likelihood term for the east neighbor also may be computed from a difference between the sampled red value of the given pixel and the sampled red value east of the given pixel. The fourth likelihood term for the west neighbor also may be computed from a difference between the sampled red value of the given pixel and the sampled red value west of the given pixel.

The likelihood of a given pixel belonging to the same region as a neighboring pixel may be determined by applying a similarity function to the sum of absolute differences corresponding to that direction. A large absolute difference in sampled values over a short distance (that is, an abrupt transition) is assumed to result from an edge. Thus a large sum of absolute differences in a given direction implies that the given pixel lies on one side of an edge (and belongs to one object), and the neighbor at that direction lies on the other side of the edge (and belongs to a different object). Therefore, a low likelihood exists that the green values of the given pixel and neighbor are similar. Exemplary similarity functions $\rho(x)$ include, but are not limited to, the following:

$$\rho(x) = \exp\left(\frac{-x^2}{\sigma^2}\right)$$

$$\rho(x) = \frac{1}{|x| + 1}$$

$$\rho(x) = \min\left(\frac{T}{|x|}, 1\right)$$

$$\rho(x) = 1/\max(|x|, 1)$$

where $T$ and $\sigma$ are scaling parameters that account for the expected noise level in the raw data. The input $x$ corresponds to a sum of absolute differences.

Correction terms are also computed (420). A first correction term for the north neighbor may be computed as a difference between the sampled red value of the given pixel and the sampled red value north of the given pixel. A second correction term for the south neighbor may be computed as a difference between the sampled red value of the given pixel and the sampled red value south of the given pixel. A third correction term for the east neighbor may be computed as a difference between the sampled red value of the given pixel and the sampled red value east of the given pixel. A fourth correction term for the west neighbor may be computed as a difference between the sampled red value of the given pixel and the sampled red value west of the given pixel.

The likelihoods, the sampled pixel values, and the correction terms are used to interpolate the missing green value at the given pixel (430). For example, the missing green pixel value ($I_G$) at a given pixel (i,j) may be computed as follows:

$$I_G(i, j) = \frac{\sum_{(a,b) \in N_4} \{\lambda[m(i, j) - m(i + 2a, j + 2b)] + m(i + a, j + b)\} w_{a,b}(i, j)}{\sum_{(a,b) \in N_4} w_{a,b}(i, j)}$$

where $N_4$ is the neighborhood consisting of the four sampled green values. The index (a,b) indicates the direction and number of pixels relative to the given pixel. For example, the neighborhood $N_4$ may consist of $\{(-1,0), (1,0), (0,-1)$ and $(0,1)\}$, which are the nearest pixels due west $(-1,0)$, due east $(1,0)$, due south $(0,-1)$ and due north $(0,1)$ of the given pixel. The above formula holds only for those pixels (i,j) that correspond to non-green positions in the mosaic image.

The bracketed term $[m(i,j)-m(i+2a,j+2b)]$ represents the correction term for sampled green value at the neighbor (a, b), and the term $m(i+a, j+b)$ represents the sampled green value at the neighbor (a, b).

The parameter $\lambda$ is a tunable parameter that corrects the interpolated value for camera-specific items, such as image resolution, camera optics, and scene distance. If device resolution is small or edges are too abrupt, the parameter $\lambda$ may have a value between 0.5 and 1. For mid-resolution cameras, the parameter $\lambda$ may have a value of 0.5. For high resolution cameras, the parameter $\lambda$ may have a value of less than 0.5.

The weights $w_{a,b}$ may be computed as $$w_{a,b}(i,j) \triangleq \rho[|m(i+2a, j+2b) - m(i,j)| + |m(i+a, j+b) - m(i-a, j-b)|]$$

The first absolute difference $|m(i+a,j+b)-m(i+a,j+b)|$ represents the differences in the green color plane, and the second absolute difference $|m(i+2a,j+2b)-m(i,j)|$ represents the difference in the red color plane.

The method is not limited to a Bayer CFA. The method may be applied to other color filter arrays.

The method is not limited to the N, S, E and W directions, or the four closest neighbors. Larger neighborhoods may be used, and pixels of different distances may be used. Weights may be reduced as distance increases.

Various methods may be used to interpolate the missing information in the red and blue color planes. One such method is bilinear interpolation of corrected values. In bilinear interpolation, likelihoods are not computed, and all weights are the same. The interpolation may be based on a smaller neighborhood because correction terms can now be computed entirely from the green plane, which is now fully populated. Therefore, differences may be taken from adjacent green pixels, as opposed to differences taken from samples that are two pixels apart (which occurs during interpolation of the green plane). The following formula may be used to interpolate a missing red or blue color $I_C(i,j)$ at pixel (i,j), given the fully populated green plane $I_G$:

$$I_c(i, j) = \frac{1}{N_{G,c}^{(i,j)}} \sum_{(a,b) \in N_{G,c}^{(i,j)}} I_G(i, j) - I_G(i + a, j + b) + m(i + a, j + b)$$

where $c \in \{R, B\}$, and

-continued $$N_{G,c}^{(i,j)} \begin{cases} \{(-1,0),(1,0)\}, & c=R, i \text{ is odd}, j \text{ is even, or} \\ & c=B, i \text{ is even}, j \text{ is odd} \\ \{(0,-1),(0,1)\}, & c=B, i \text{ is odd}, j \text{ is even, or} \\ & c=R, i \text{ is even}, j \text{ is odd} \\ \{(-1,-1),(-1,1)\}, & c=R, i \text{ is odd}, j \text{ is odd, or} \\ \{(1,-1),(1,1)\}, & c=B, i \text{ is even}, j \text{ is even} \end{cases}$$

Figure 5:
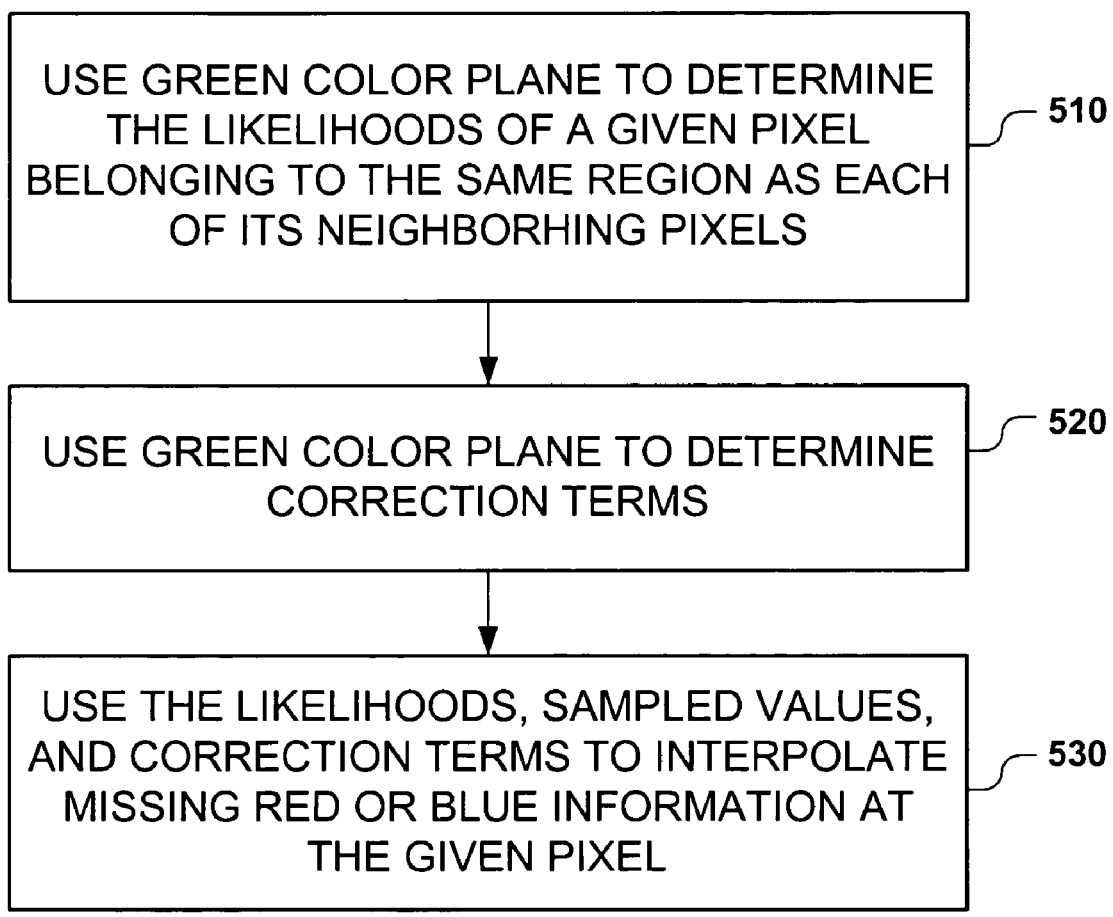
FIG. 5 is an illustration of a first method of interpolating missing red and blue information during demosaicing in accordance with an embodiment of the present invention.
Figure 6:
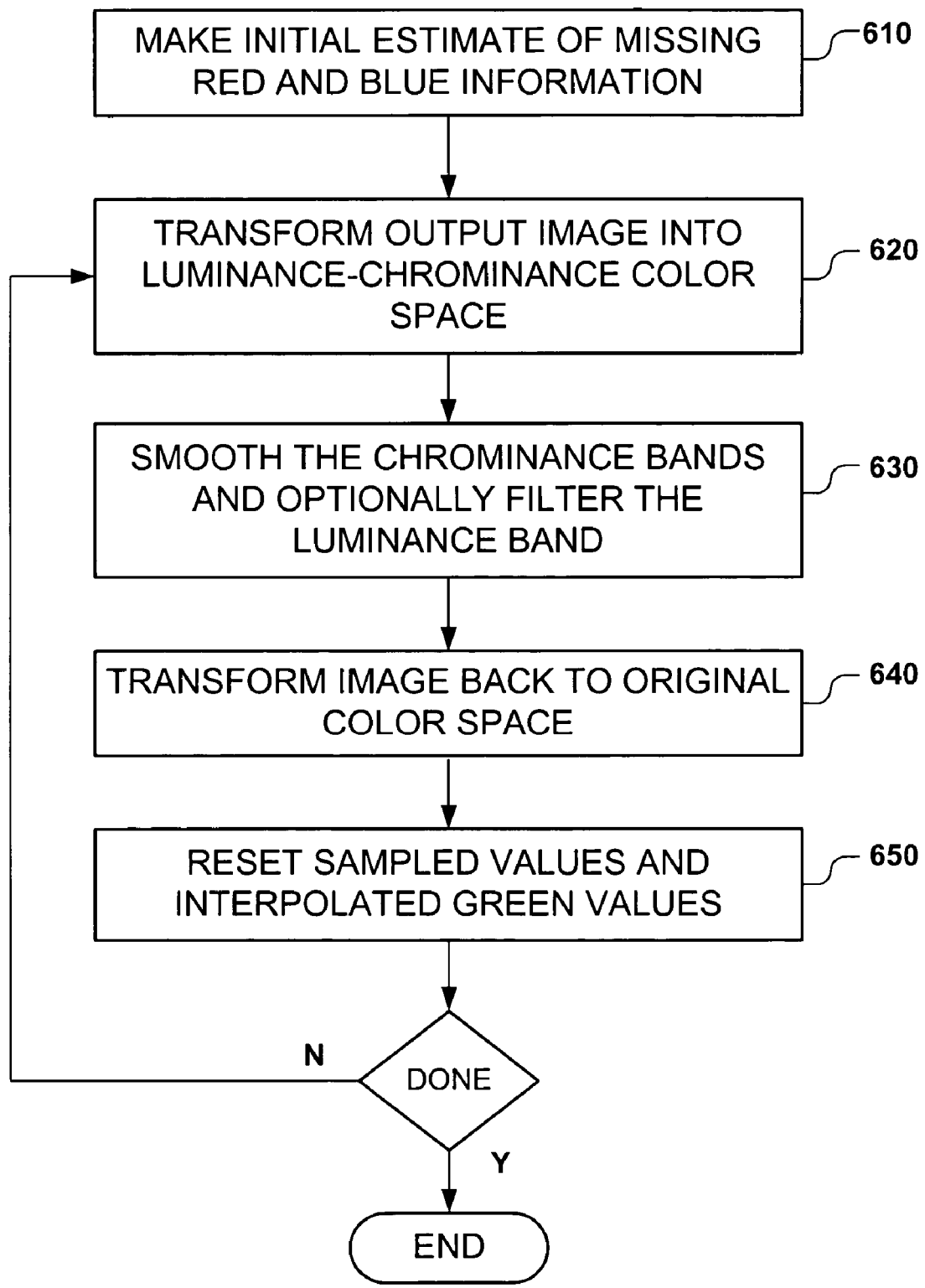
FIG. 6 is an illustration of a second method of interpolating missing red and blue information during demosaicing in accordance with an embodiment of the present invention.
Figure 7:
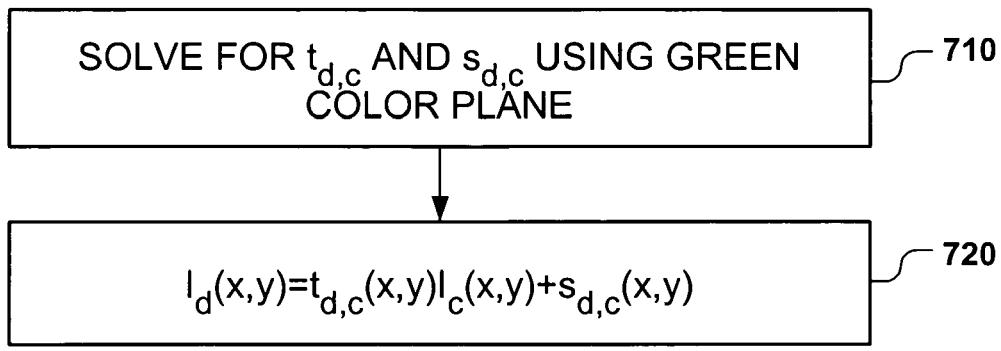
FIG. 7 is an illustration of a third method of interpolating missing red and blue information during demosaicing in accordance with an embodiment of the present invention.

FIGS. 5-7 illustrate other methods of interpolating the missing information in the red and blue color planes. Reference is now made to FIG. 5, which illustrates a method that is essentially the same as the method used to interpolate the missing green information. The nearest sampled red or blue value in each direction is two pixels from the given pixel. At step 510, the likelihoods are determined from the green plane only. In addition, the correction terms are determined from the green plane (step 520). At step 530, the following formula may be used to interpolate a missing color $I_C(i,j)$ at pixel (i,j):

$$I_c(i,j) = \frac{\sum_{(a,b) \in N_{G,c}^{(i,j)}} [I_G(i,j) - I_G(i+a, j+b) + m(i+a, j+b)] u_{a,b}(i,j)}{\sum_{(a,b) \in N_{G,c}^{(i,j)}} u_{a,b}(i,j)}$$

where $c \in \{R, B\}$, and $$N_{G,c}^{(i,j)} \begin{cases} \{(-1,0),(1,0)\}, & c=R, i \text{ is odd}, j \text{ is even, or} \\ & c=B, i \text{ is even}, j \text{ is odd} \\ \{(0,-1),(0,1)\}, & c=B, i \text{ is odd}, j \text{ is even, or} \\ & c=R, i \text{ is even}, j \text{ is odd} \\ \{(-1,-1),(-1,1)\}, & c=R, i \text{ is odd}, j \text{ is odd, or} \\ \{(1,-1),(1,1)\}, & c=B, i \text{ is even}, j \text{ is even} \end{cases}$$

and $$u_{a,b}(i,j) \triangleq \rho[|I_G(i,j) - I_G(i+a, j+b)|].$$

Reference is now made to FIG. 6, which illustrates a canonical correlation method of interpolating the missing red and blue information. An initial estimate for the missing values is made (610). For instance, the initial estimate may be made by using standard bilinear demosaicing. These initial estimates are added to the output image. Thus, at the end of step 610, the output image includes sampled and interpolated values for the green plane, and sampled and estimated values for the red and blue planes.

The output image is transformed into a luminance-chrominance color space (620). For example, the output image may be transformed into YIQ color space.

The chrominance bands of the YIQ color space are strongly smoothed (630). The luminance band may be lightly smoothed; left unchanged, or even lightly sharpened (630). According to the principles achieved by canonical correlation analysis, natural images are expected to be smooth in chrominance bands, whereas all sharpness that the human eye perceives is expected to stem from the luminance band only. In terms of frequencies, light smoothing would be less aggressive in reducing high-frequencies of an image, as compared to the strong smoothing.

The output image is transformed back to its original color space (640), and reset to the sampled values and green interpolated values (650). Step 650 imposes a constraint on the interpolation. After filtering in the YIQ domain, the sampled values in the green plane of the output image are likely to change from their original values. The previously calculated green plane is likely to have changed as well. Imposing the constraints or resetting the sampled and green interpolated values is performed to replace the output green plane by the previously calculated green plane, and to reset the original red and blue mosaic samples on their corresponding positions.

Steps 620 to 650 may be repeated several times. The steps 620 to 650 may converge to an optimal result. The iterations can be stopped when the result is "close enough" to the optimum. For example, the iterations can be stopped when the improvement (Euclidean distance between the image before and after an iteration) becomes smaller than a threshold. In the alternative, a fixed number of iterations can be performed. The fixed number would typically bring the output close enough to the optimum.

Provided that the smoothing is linear, a fixed number of iterations can be concatenated into a single linear operation to provide a set of twelve linear convolution kernels. A set of kernels can be convolved with the pixel values of each cell.

Reference is now made to FIG. 7, which illustrates affine interpolation of the missing red and blue information. The following formula may be used to interpolate a missing color $I_c(i,j)$ at pixel (i,j):

$$I_d(x,y) = t_{d,c}(x,y) I_c(x,y) + s_{d,c}(x,y)$$

where $d, c \in \{R, G, B\}$, $s_{d,c}$ is a slowly varying function of a shift in color c, and $t_{d,c}$ is a slowly varying function that scales the intensity gradient.

The function $s_{d,c}$ is based on the assumption that object boundaries in a small spatial neighborhood are the same in all three color planes, or that the high frequency components (edges depicting object boundaries) in a small spatial neighborhood are similar in all three planes and equal with the high frequency component of the green plane.

The function $t_{d,c}$ is based on the assumption that an edge in a color plane can vary by a different amount than the same edge in another color plane.

The functions $s_{d,c}$ and $t_{d,c}$ can be solved for from the green plane. Consider a pixel $(i_0, j_0)$ having missing red information. Red information $I_R(i_q, j_q)$ and green information $I_G(i_q, j_q)$ are known at neighboring pixels $(i_q, j_q)$, $q=1, \ldots, k$, where either $i_0$ or $j_0$ are odd, where $i_q$ and $j_q$ are even, and where $(i_q, j_q) \in N(i_0, j_0)$. The following set of equations is obtained.

$$\{I_R(i_q, j_q) = t_{R,G}(i_0, j_0) I_G(i_q, j_q) + s_{R,G}(i_0, j_0)\}_{q=1}^{k}.$$

These inequalities can be rewritten in matrix form:

$$\begin{pmatrix} I_G(i_1, j_1) & 1 \\ I_G(i_2, j_2) & 1 \\ \vdots & \vdots \\ I_G(i_k, j_k) & 1 \end{pmatrix} \begin{pmatrix} t_{R,G}(i_0, j_0) \\ s_{R,G}(i_0, j_0) \end{pmatrix} = \begin{pmatrix} I_R(i_1, j_1) \\ I_R(i_2, j_2) \\ \vdots \\ I_R(i_k, j_k) \end{pmatrix}$$

A Mean Least Squares solution gives the following $$\hat{t}_{R,G}(i_0, j_0) = \frac{E\{I_G I_R\}(i_0, j_0) - E\{I_G\}(i_0, j_0) E\{I_R\}(i_0, j_0)}{E\{I_G^2\}(i_0, j_0) - E^2\{I_G\}(i_0, j_0)}$$

and $$\hat{s}_{R,G}(i_0, j_0) = E\{I_R\}(i_0, j_0) - \hat{t}_{R,G}(i_0, j_0) E\{I_G\}(i_0, j_0) E\{I_G\}(i_0, j_0)$$

where $$E\{f\}(i_0, j_0) = \frac{1}{k} \sum_{(i_q, j_q)} f(i_q, j_q)$$

for $(i_q, j_q) \in N(i_0, j_0)$ where $i_q$ and $j_q$ are even.

Neighborhood size is based on assumptions about how quickly $t_{d,c}$ and $s_{d,c}$ change. A 5×5 neighborhood has been found to provide a reasonable tradeoff of accuracy versus stability. Increasing the neighborhood size can improve the accuracy, but decrease the stability, since there is a greater chance that $t_{d,c}$ and $s_{d,c}$ will not remain constant.

The operator $E\{\ \}$ may be regarded as a simple averaging of neighborhood. The following equation, which can be used instead, produces a weighted average.

$$E\{f\}(i_0, j_0) = \frac{1}{k} \frac{\sum_{(i_q, j_q)} f(i_q, j_q) u_q(i_0, j_0)}{\sum_{(i_q, j_q)} u_q(i_0, j_0)}$$

where $$u_q(i_0, j_0) = \rho(|I_G(i_0, j_0) - I_G(i_q, j_q)|).$$

Figure 8:
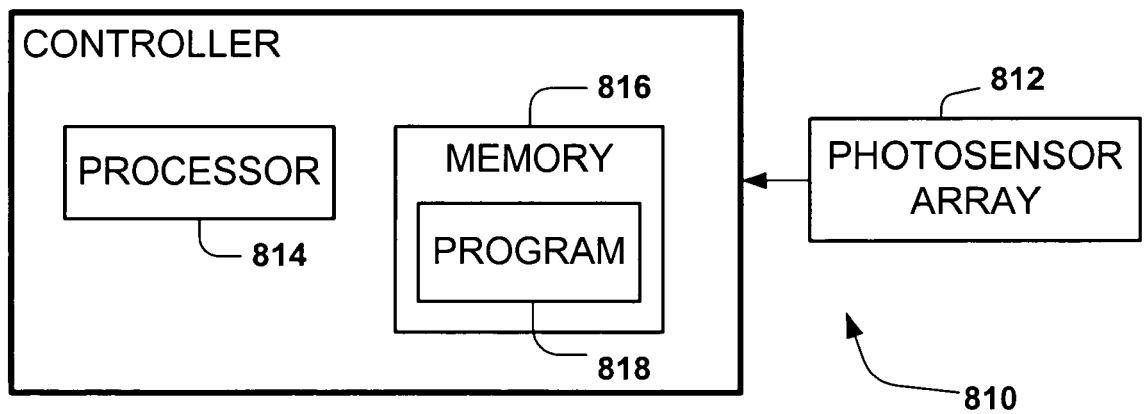
FIG. 8 is an illustration of an apparatus for performing image demosaicing in accordance with an embodiment of the present invention.

Reference is made to FIG. 8, which illustrates an exemplary hardware implementation of the methods above. A digital camera 810 includes a photosensor array 812 such as a CCD. The photosensors of the array 812 may be arranged in a Bayer CFA. The array 812 produces mosaic digital images.

The digital camera 810 also includes a digital signal processor 814 and memory 816 (e.g., EPROM). A program 818 encoded in the memory 816 instructs the digital signal processor 814 to transform mosaic images into digital images having full color information at each pixel in accordance with an embodiment of the present invention. The program 818 may include a lookup table for different values of the similarity function. Weights are computed on the fly, and applied to the pixels using an algorithm.

Another implementation (not shown) may include an application-specific integrated circuit (ASIC). The ASIC includes a processor for transforming mosaic images into digital images having full color information at each pixel in accordance with an embodiment of the present invention. The processor may include a state machine, or it may include an embedded processor and memory, or it may have some other design.

Figure 9:
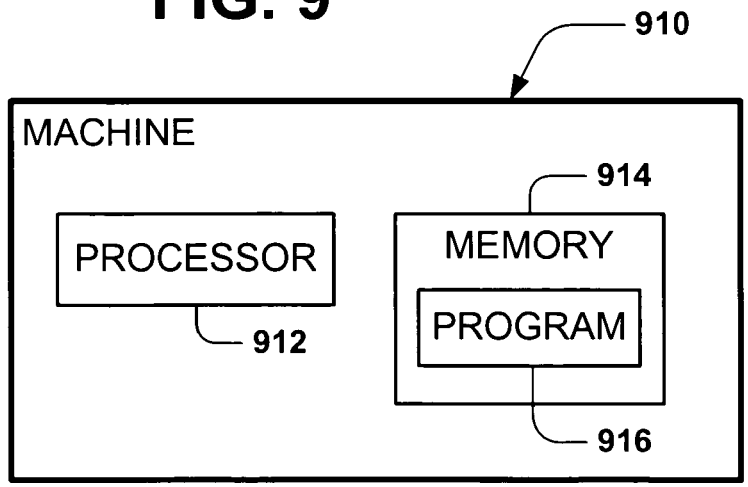
FIG. 9 is an illustration of an apparatus for performing image demosaicing in accordance with an embodiment of the present invention.

Reference is now made to FIG. 9, which illustrates another hardware implementation. A digital imaging system 910 includes a general purpose processor 912 and memory 914 for instructing the processor 912 to process mosaic images in accordance with an embodiment of the present invention. The system may be, for example, a personal computer. Mosaic images may be supplied to the system 910 directly by a capture device (e.g., a scanner, a digital camera) or indirectly (via the Internet, accessed from remote or local storage, etc.).

A machine for generating the program may be a personal computer such as the one shown in FIG. 9. Source code is generated, compiled into executable code, and distributed.

The executable code may be distributed in variety of ways. For example, the executable code may be distributed to a digital camera by burning the code into an EPROM of the digital camera. The executable code can be distributed to a computer via a network transmission, removable storage medium (e.g., CD), etc.

The present invention is not limited to the specific embodiments described above. Instead, the present invention is construed according to the following claims.

The invention claimed is:

1. A method of processing a digital image, each pixel of the digital image having only a single sampled value, the method comprising interpolating green values at pixels where green values were not sampled, the interpolation of the green value at a given pixel including:

determining likelihoods of the given pixel belonging to the same region as each of at least two other pixels having sampled green values, the other pixels in different directions relative to the given pixel;

using the likelihoods and the sampled values of the other pixels to interpolate the green value at the given pixel; and using sampled values of a second color to compute terms for correcting the interpolated green values.

2. The method of claim 1, wherein at least two of the directions are orthogonal.

3. The method of claim 1, wherein the directions include north, south, east and west of the given pixel.

4. The method of claim 1, wherein the sampled pixel values are of neighboring pixels nearest the given pixel.

5. The method of claim 1, wherein determining the likelihoods includes applying a similarity function to differences between sampled values.

6. The method of claim 5, wherein determining the likelihoods includes using the differences to index a lookup table of precomputed likelihoods.

7. The method of claim 5, wherein a missing color value $I_c(i,j)$ at pixel $(i,j)$ is computed as $$I_c(i, j) = \frac{\sum_{(a,b) \in N_{G,c}^{(i,j)}} [I_G(i, j) - I_G(i+a, j+b) + m(i+a, j+b)] u_{a,b}(i, j)}{\sum_{(a,b) \in N_{G,c}^{(i,j)}} u_{a,b}(i, j)}$$

where $c \in \{R, B\}$, and $$N_{G,c}^{(i,j)} \begin{cases} \{(-1, 0), (1, 0)\}, & \begin{array}{l} c = R, i \text{ is odd}, j \text{ is even, or} \\ c = B, i \text{ is even}, j \text{ is odd} \end{array} \\ \{(0, -1), (0, 1)\}, & \begin{array}{l} c = B, i \text{ is odd}, j \text{ is even, or} \\ c = R, i \text{ is even}, j \text{ is odd} \end{array} \\ \{(-1, -1), (-1, 1)\}, & c = R, i \text{ is odd}, j \text{ is odd, or} \\ \{(1, -1), (1, 1)\}, & c = B, i \text{ is even}, j \text{ is even} \end{cases}$$

and $$u_{a,b}(i, j) \triangleq \rho[|I_G(i, j) - I_G(i+a, j+b)|].$$

8. The method of claim 1, wherein the likelihoods are used to compute a weighted average of the sampled values.

9. The method of claim 1, wherein missing green information ($I_G$) at a given pixel $(i,j)$ is computed as $$I_G(i, j) = \frac{\sum_{(a,b)\in N} \{\lambda[m(i, j) - m(i + 2a, j + 2b)] + m(i + 2, j + b)\}w_{a,b}(i, j)}{\sum_{(a,b)\in N} w_{a,b}(i, j)}$$

where m(i,j) is a sampled pixel value, a and b are components of a vector (a,b), λ is a tunable parameter, N is a neighborhood of pixels, and $w_{a,b}$ are weights corresponding to the vector (a,b).

10. The method of claim 9, wherein the weights $w_{a,b}$ are computed as $$w_{a,b}(i,j) \triangleq \rho[|m(i+2a,j+2b)-m(i,j)|+|m(i+a,j+b)-m(i-a, j-b)|],$$

where ρ[•] is a similarity function.

11. The method of claim 1, wherein the digital image corresponds to a Bayer CFA.

12. The method of claim 1, further comprising interpolating additional missing values of a second color, the interpolation of a second color value at the given pixel including:
   using sampled and interpolated green values to determine likelihoods of the given pixel belonging to the same region as neighboring pixels; and
   using the likelihoods and sampled second color values in the neighborhood to interpolate the second color value at the given pixel.

13. The method of claim 12, further comprising computing correction terms for correcting the interpolated second color values in the neighborhood.

14. The method of claim 1, further comprising interpolating at least one of the other missing colors, including:
   making an initial estimate for the other missing colors;
   transforming an output image into a luminance-chrominance color space, the output image including sampled and interpolated values of the first color, and sampled values of the other colors;
   smoothing the luminance and chrominance bands;
   transforming the output image back to its original color space; and
   resetting sampled values and green interpolated values in the output image.

15. The method of claim 14, wherein each step is a linear operation, and wherein the steps are performed by applying a concatenation of the linear operations to the output image.

16. A method of processing a digital image, each pixel of the digital image having only a single sampled value, the method comprising interpolating values of a first color at pixels where the first color was not sampled, the interpolation of the first color value at a given pixel including:
   determining likelihoods of the given pixel belonging to the same region as each of at least two other pixels having sampled values of the first color, the other pixels in different directions relative to the given pixel;
   using the likelihoods and the sampled values of the other pixels to interpolate the first color at the given pixel; and
   using sampled values of a second color to compute terms for correcting the sampled values of the first color, including taking a difference between the sampled value at the given pixel and the sampled value of the second color at a neighbor, the neighbor lying in the same direction as the pixel being corrected.

17. The method of claim 16, wherein the likelihoods are used to compute a weighted average of the sampled values and correction terms.

18. A method of processing a digital image, each pixel of the digital image having only a single sampled value, the method comprising interpolating values of a first color at pixels where the first color was not sampled, the interpolation of the first color value at a given pixel including:
   determining likelihoods of the given pixel belonging to the same region as each of at least two other pixels having sampled values of the first color, the other pixels in different directions relative to the given pixel;
   using the likelihoods and the sampled values of the other pixels to interpolate the first color at the given pixel; and
   using bilinear interpolation to interpolate missing information in other color planes, wherein the interpolation includes using sampled and interpolated green pixel values.

19. A method of processing a digital image, each pixel of the digital image having only a single sampled value, the method comprising interpolating values of a first color at pixels where the first color was not sampled, the interpolation of the first color value at a given pixel including:
   determining likelihoods of the given pixel belonging to the same region as each of at least two other pixels having sampled values of the first color, the other pixels in different directions relative to the given pixel;
   using the likelihoods and the sampled values of the other pixels to interpolate the first color at the given pixel; and
   performing affine interpolation of at least one other color as $$I_d(x,y) = t_{d,c}(x,y)I_c(x,y) + s_{d,c}(x,y)$$

where $I_d$ is the color to be interpolated at pixel coordinates (x,y), $I_c$ is either the green sampled value or the green interpolated value, $s_{d,c}$ is a slowly varying function of a shift in color c, and $t_{d,c}$ is a slowly varying function that can change an intensity gradient.

20. Apparatus comprising a processor for interpolating missing values in a first color plane of a mosaic image, the interpolation of a given pixel in the color plane including:
   determining likelihoods of neighbors belonging to the same region as the given pixel, the neighbors having sampled values of the first color, at least two of the neighbors lying in different directions relative to the given pixel;
   using the likelihoods and the sampled values to interpolate a first color value for the given pixel; and
   using sampled values in a second color plane to compute correction terms for the interpolated values in the first color plane, including taking a difference between the sampled value at the given pixel and a sampled value in the second color plane at a neighbor, the neighbor lying in the same direction as the sampled value being corrected.

21. The apparatus of claim 20, wherein the likelihoods are used to compute a weighted average of the sampled values and the correction terms.

22. The apparatus of claim 20, wherein determining the likelihoods includes applying a similarity function to differences between sampled values.

23. The apparatus of claim 20, wherein the first color is green, whereby missing information in a green color plane is interpolated.

24. The apparatus of claim 20, wherein the processor also interpolates at least one other missing color value at each pixel.

25. The apparatus of claim 20, wherein the processor further interpolates a second color plane, the interpolation of a second color value at the given pixel including:

using sampled and interpolated first color values to determine likelihoods of the given pixel belonging to the same region as neighboring pixels; and using the likelihoods and sampled second color values in the neighborhood to interpolate the second color value at the given pixel.

26. The apparatus of claim 20, wherein the processor further interpolates additional color planes, the interpolation of the additional color planes including:

making an initial estimate for missing information in the additional color planes;

transforming an output image into a luminance-chrominance color space, the output image including sampled and interpolated values of the first color, and sampled values of the other colors;

smoothing the luminance and chrominance bands;

transforming the output image back to its original color space; and resetting measured values and green interpolated values in the output image.

27. The apparatus of claim 20, wherein the processor further interpolates a second color plane, the interpolation of a second color value of a given pixel at pixel coordinates (x,y) performed according to:

$$I_d(x,y)=t_{d,c}(x,y)I_c(x,y)+s_{d,c}(x,y)$$

where $I_d$ is the second color value, $I_c$ is either the green sampled value or the green interpolated value at pixel coordinates (x,y), $s_{d,c}$ is a slowly varying function of a shift in color c, and $t_{d,c}$ is a slowly varying function that can change an intensity gradient.

28. Apparatus for processing a mosaic image, the apparatus comprising:

means for using sampled values in a green plane of the mosaic image to determine the likelihoods of a given pixel belong to the same region as at least two different neighbors lying in different directions; and means for using the likelihoods, sampled values in the different directions, and correction terms to interpolate a value at the given pixel, the interpolated value being in the green plane, the correction terms computed from non-green sampled values.

29. The apparatus of claim 28, further comprising means for acquiring the mosaic image.

30. A digital camera comprising:

a photosensor array for acquiring mosaic images; and a digital signal processor for processing the mosaic images, the processing including interpolating missing values from sampled values in the mosaic image, the interpolation of a green value of a given pixel including determining the likelihoods of neighbors belonging to the same region as the given pixel, the neighbors being in at least two different directions relative to the given pixel; using the likelihoods, a correction term and the sampled values of the neighbors to interpolate the green value at the given pixel; the correction term computed from neighboring sampled values of a second color and also from the likelihoods.

31. An article for instructing a processor to process a mosaic image, the article comprising memory encoded with instructions for instructing the processor to interpolate missing green values, the interpolation of a green value of a given pixel including determining likelihoods of neighbors having sampled green values being in the same region as the given pixel, and using correction terms, the sampled values and the likelihoods of those neighbors to interpolate the green value at the given pixel, at least one neighbor being in a first direction relative to the given pixel, at least one neighbor being in a second direction relative to the given pixel, where the first and second directions are orthogonal; the correction terms computed from sampled non-green values of neighboring pixels and also from the likelihoods.

* * * * *

UNITED STATES PATENT AND TRADEMARK OFFICE
CERTIFICATE OF CORRECTION

PATENT NO. : 7,440,016 B2  Page 1 of 1
APPLICATION NO. : 10/743623
DATED : October 21, 2008
INVENTOR(S) : Renato Keshet et al.

It is certified that error appears in the above-identified patent and that said Letters Patent is hereby corrected as shown below:

In column 6, lines 33-34, delete " $w_{a,b}(i,j) \triangleq \rho[|m(i+2a, j+2b)-m(i,j)|+|m(i+a, j+b)-m(i-a, j-b)|]$ " and insert -- $w_{a,b}(i,j) \stackrel{\Delta}{=} \rho[|m(i+2a, j+2b) - m(i,j)| + |m(i+a, j+b) - m(i-a, j-b)|]$ --, therefore.

In column 10, line 41, in Claim 7, delete "(i.j)" and insert -- (i,j) --, therefor.

In column 11, lines 15-16, in Claim 10, delete " $w_{a,b}(i,j) \triangleq \rho[|m(i+2a,j+2b)-m(i,j)|+|m(i+a,j+b)-m(i-a, j-b)|],$ " and insert -- $w_{a,b}(i,j) \stackrel{\Delta}{=} \rho[|m(i+2a, j+2b) - m(i,j)| + |m(i+a, j+b) - m(i-a, j-b)|],$ --, therefore.

In column 13, line 36, in Claim 28, delete "belong" and insert -- belonging --, therefor.

Signed and Sealed this

Sixteenth Day of February, 2010

David J. Kappos
*Director of the United States Patent and Trademark Office*